United States Patent Office 3,032,590
Patented May 1, 1962

3,032,590
PREPARATION OF CYCLIC TRIS(DIALKYL-PHOSPHINOBORINES)
Raymond Charles Cass, New Malden, Richard Long, Hinchley Wood, Esher, and Michael Peter Brown, Tolworth, England, assignors to United States Borax and Chemical Corporation, Los Angeles, Calif., a company of Nevada
No Drawing. Filed Apr. 26, 1960, Ser. No. 24,681
Claims priority, application Great Britain Apr. 30, 1959
7 Claims. (Cl. 260—606.5)

This invention relates to the preparation of compounds of boron and phosphorus.

Attempts to meet the increasing demand for polymeric materials which will withstand high temperatures have lead to a large amount of work being undertaken into the chemistry of boron-phosphorus compounds. One series of such compounds which have shown particular promise in view of their stability towards hydrolysis and high temperatures (of the order of 350° C.) are the cyclic tris(dialkylphosphinoborines), which have the structural formula

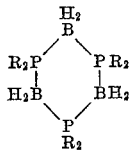

wherein each R represents an alkyl, cycloalkyl or aryl group. It is thought that such compounds may also be of value as intermediates for the production of high molecular weight polymers containing boron and phosphorus.

Two methods are usually used for the preparation of these cyclic tris(dialkylphosphinoborines). One depends upon the formation of an addition compound by the reaction of a dialkylphosphine with diborane and the subsequent pyrolysis of the addition compound, in accordance with the equations:

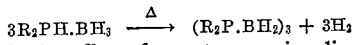

This method suffers from two main disadvantages, namely that the phosphines are not readily available and that it is necessary to employ diborane which is explosively labile.

The second method depends upon the reaction of sodium borohydride with a dialkylphosphonyl chloride in a suitable solvent, probably in accordance with the equation:

the $R_2P.BH_2$ being unknown as a monomer and trimerizing instantaneously on formation by the co-ordination of the P atom of one unit of $R_2P.BH_2$ to the B atom of another unit thereof. Although the reaction is thought to proceed as indicated by the equation shown yields are low, being of the order of 40%, and the dialkylphosphonyl chlorides are tedious and difficult to prepare and are themselves only obtained in very poor yields.

It is an object of the present invention to provide an improved process for the synthesis of cyclic tris(disubstituted phosphinoborines) in good yields from readily available starting materials.

Accordingly the present invention provides a process for the preparation of compounds of the general formula:

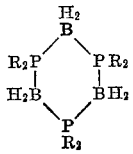

wherein each R, which may be the same or different, represents an alkyl, cycloalkyl or aryl radical containing up to six carbon atoms, which radical may be substituted, which comprises reacting 1 mole of a tetra-substituted diphosphine disulphide of the general formula:

$R_2PS.SPR_2$ 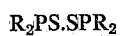

wherein each R has the same significance as above, with from 1.5 to 3.5 moles of lithium, sodium or potassium borohydride at an elevated temperature, either with or without a solvent. The reaction of one mole of the $R_2PS.SPR_2$ compound with 2 moles of the borohydride will in theory provide ⅔ of a mole of the cyclic trimer and does in practice provide good yields thereof.

When no solvent is used the two reactants are heated to a temperature above the melting point of the tetra-substituted diphosphine disulphide in an inert atmosphere.

If a solvent is used then the solution of the two reactants may either be heated together in the solvent or the solvent removed by distillation, preferably at reduced pressure. The resulting complex is decomposed by heat. When a solvent is employed, the reactants will require heating to a temperature exceeding 150° C. to effect the reaction between them.

It has particularly been found that the process of this invention will give good yields of pure tris(dimethylphosphinoborine) on reacting tetramethyldiphosphine disulphide with sodium, potassium or, most advantageously, lithium borohydride. Whilst the best yields appear to be obtained by using lithium borohydride, the yields obtainable by the use of sodium or potassium borohydride may be increased substantially by the use of a suitable catalyst, particularly an anhydrous halide of lithium, preferably in a proportion of about 10%. The use of catalysts as aforesaid is, of course, of general application to the process of the invention and is not limited to that case in which each R represents a methyl group.

The following examples further illustrate the invention:

*Example I*

A well powdered and intimate mixture consisting of 5.67 g. of sodium borohydride and 7.00 g. of tetramethyldiphosphine disulphide were heated in an inert atmosphere at 250° C. for 6 hours. After the mixture had cooled to room temperature it was extracted with light petroleum. Evaporation of the solvent yielded 4.26 g. of tris(dimethylphosphinoborine), corresponding to a yield of 75.5% of theory.

*Example II*

A similar mixture consisting of 2.58 g. of sodium borohydride and 8.48 g. of tetramethyldiphosphine disulphide on heating to 250° C. for 6 hours yielded, on extraction with petroleum, 2.70 g. (53% of theory) of tris(dimethylphosphinoborine).

*Example III*

When 10 g. of the complex formed from the reaction between 2 moles of sodium borohydride and 1 mole of tetramethyldiphosphine disulphide from which the solvent (dimethylether of diethylene glycol) has been removed is heated to 250° C. in an inert atmosphere for 6 hours and the residue extracted, 1.85 g. of tris(dimethylphosphinoborine) is formed. This corresponds to a yield of 34% of theory.

*Example IV*

When 10 g. of the complex mentioned in Example III is heated to 250° C. at a pressure of 18 mms. of mercury, 2.75 g. of tris(dimethylphosphinoborine) sublimes from the reaction mixture. This corresponds to a yield of 67% of theory.

Example V

An intimate mixture of 12.1 g. of tetraethyldiphosphine disulphide and 6.5 g. of lithium borohydride was heated to 300° C. for 5 hours. Extraction of the reaction mixture with light petroleum (40–60° C.) yielded 6.3 g. of tris(diethylphosphinoborine) as a colourless oil, B.P. 185° C./12 mm. This corresponds to a yield of 62% of theory.

What we claim is:

1. The method for the preparation of cyclic tris(dialkylphosphinoborines) having the formula

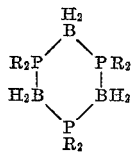

which comprises reacting at elevated temperature about one mole of a tetra-substituted diphosphine disulphide of the general formula

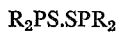

with from about 1.5 to about 3.5 moles of an alkali metal borohydride, where R is an alkyl group having from 1 to 6 carbon atoms.

2. The process of claim 1 wherein said reaction is carried out in the presence of a solvent and the reactants are heated to a temperature above 150° C.

3. The method of claim 1 wherein the alkali metal borohydride is lithium borohydride.

4. The method of claim 1 wherein the alkali metal borohydride is sodium borohydride.

5. The method of claim 1 wherein said alkali metal borohydride is potassium borohydride.

6. The method of claim 1 wherein said tetra-substituted diphosphine disulphide is tetramethyldiphosphine disulphide.

7. The method of claim 1 wherein said tetra-substituted diphosphine disulphide is tetraethyldiphosphine disulphide.

References Cited in the file of this patent
UNITED STATES PATENTS 2,921,096    Burg et al. _____ Jan. 12, 1960

OTHER REFERENCES

Burg et al.: J. Am. Chem. Soc., vol. 75, pages 3872–7 (1953).